United States Patent [19]
Knels

[11] Patent Number: 4,583,598
[45] Date of Patent: Apr. 22, 1986

[54] ROW MARKER

[76] Inventor: Kenneth J. Knels, Rte. #2, Box 93A, Fairview, Mont. 59221

[21] Appl. No.: 607,154

[22] Filed: May 4, 1984

[51] Int. Cl.[4] .............................................. A01B 17/00
[52] U.S. Cl. ....................................... 172/126; 172/456
[58] Field of Search ............... 172/126, 127, 128, 129, 172/130, 131, 132, 311, 456

[56] References Cited
U.S. PATENT DOCUMENTS

| | | | |
|---|---|---|---|
| 1,046,559 | 12/1912 | Cook . | |
| 2,356,030 | 8/1944 | Byers . | |
| 2,979,136 | 4/1961 | Oehler et al. . | |
| 3,072,200 | 1/1963 | Yerkes | 172/126 |
| 3,511,316 | 5/1970 | Oerman et al. . | |
| 3,627,057 | 12/1971 | Hartwig | 172/126 |
| 3,669,195 | 6/1972 | Green et al. . | |
| 3,762,482 | 10/1973 | Johnson | 172/132 |
| 3,766,987 | 10/1973 | Orthman | 172/126 |
| 3,797,580 | 3/1974 | Roth | 172/311 |
| 4,047,575 | 9/1977 | Wagner | 172/311 |
| 4,207,950 | 6/1980 | Kinzenbaw | 172/126 |
| 4,449,590 | 5/1984 | Williamson | 172/126 |

FOREIGN PATENT DOCUMENTS
609499  6/1978  U.S.S.R. ............................... 172/126

*Primary Examiner*—Richard J. Johnson
*Attorney, Agent, or Firm*—Robert C. Baker

[57] ABSTRACT

The row marker for farm planters has a horizontal base bar and a vertical post. A main arm and brace arm are pivotally mounted to the base bar. A marker bar is pivotally mounted between the outer ends of the main and brace arms, with the pivot mounting of the marker bar being intermediate its ends so as to provide a stub lever marker bar section. A diversion arm extends between the main and brace arms and has one end mounted for pivotal and longitudinally floating movement at the upper end of the post, and the other end pivotally mounted to the stub lever marker bar section. Powered means swings the main arm upwardly and effects an overhead folding of the marker bar. The floating pivot of the diversion arm permits variation in the horizontal projection of the main arm and marker bar in response to the level of land.

10 Claims, 8 Drawing Figures

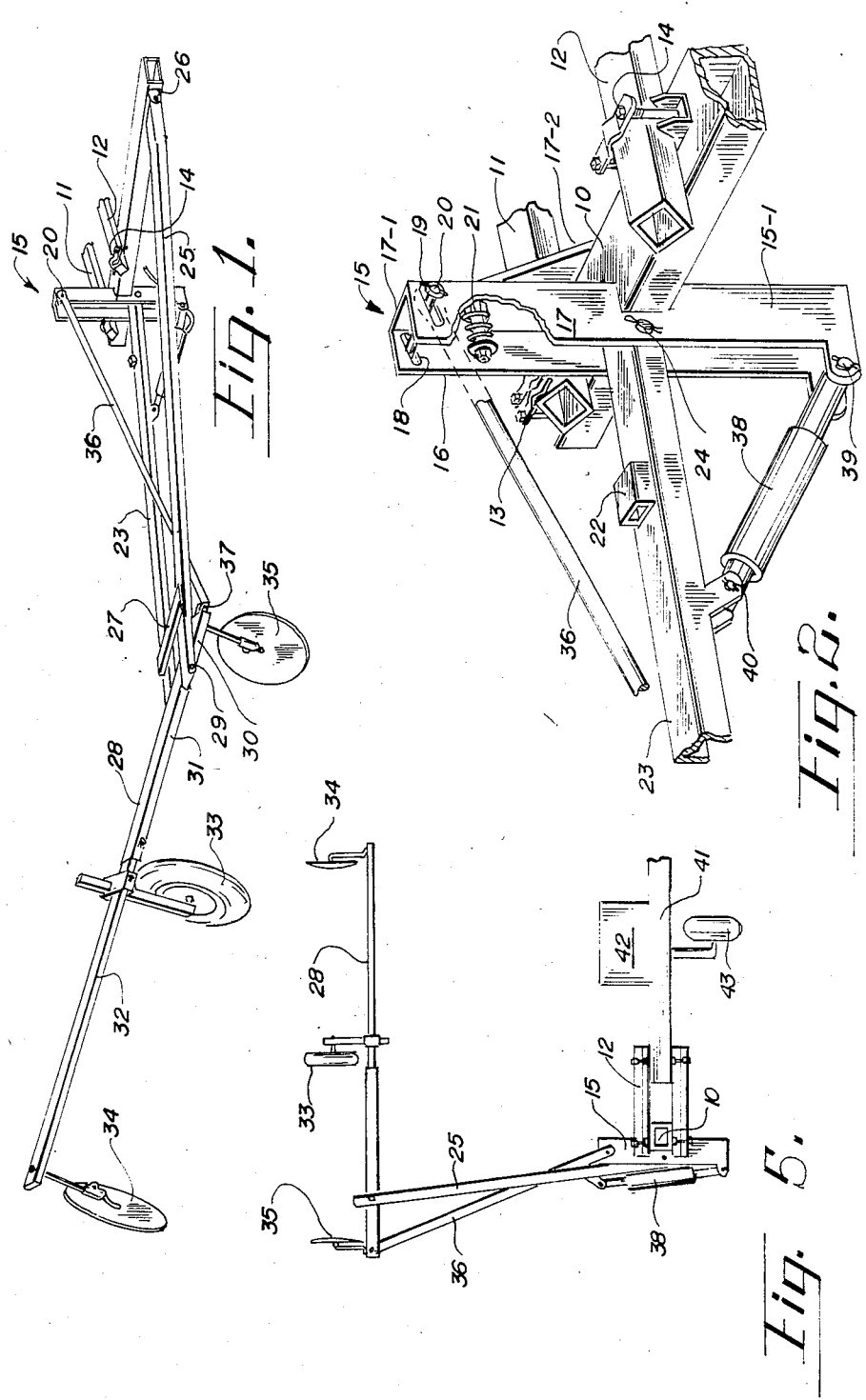

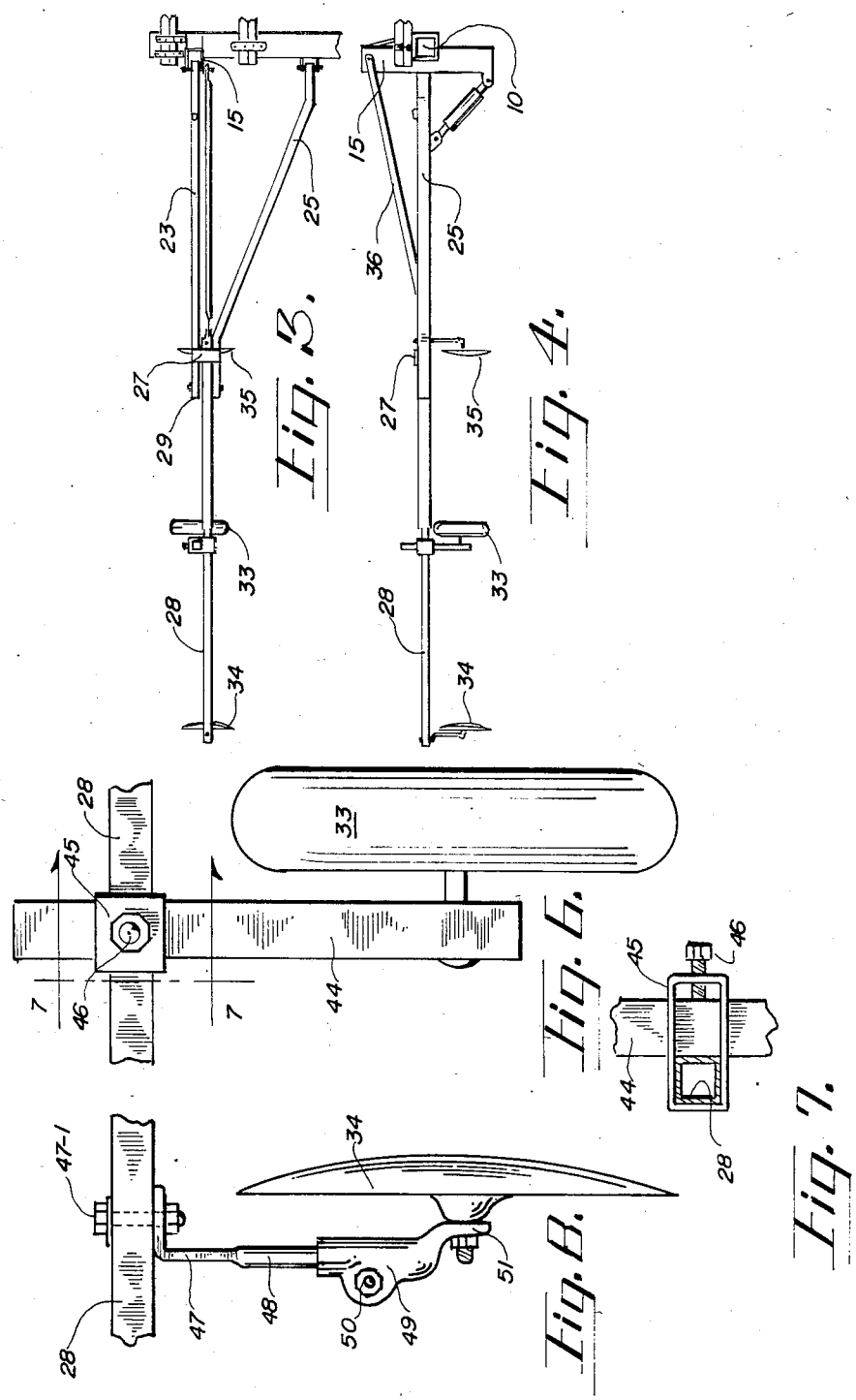

ROW MARKER

BACKGROUND OF THE INVENTION

This invention relates to a row marker for agricultural purposes and particularly for farm implements of the type having an elongated mainframe generally disposed transversely to the direction for its travel over a field in farming operations.

Row markers of the invention are especially useful on seeding machines or planters for row crops such as sugar beets, corn, beans, soybeans, sunflowers, cotton, and the like. They are also useful on grain drills for non-row crops, especially where efficient seed distribution without waste and overplanting is desired.

Row markers of a variety of types have heretofore been available. Those which have permitted remote controlled elevation or folding for the turn around operation at the end of a field have, even in the folded condition, projected a substantial distance outwardly from the end of the planter or have in elevated condition projected a substantial distance upwardly. The problem is that of accomplishing effective controlled planting as near as possible at the ends of fields, especially ends bordered by trees or fences.

Any solution to this problem which depends on manual adjustment of marker elements at the end of each planting strip is totally unsatisfactory. Remote controlled lifting or folding of the row marker is critically necessary; but as aforenoted, all known row markers having any capability of remote controlled lifting or folding are unsatisfactory from the standpoint of their projection so far outwardly or upwardly as to preclude convenient planting close to the end of a field bordered by trees or fences or the like.

SUMMARY OF THE INVENTION

The row marker of this invention comprises a marker assembly swingable from a substantially horizontal orientation operative for marking into an upright overhead folded condition inoperative for marking. The upright folded condition is such that the marker bar of the row marker is actually folded over a portion of the mainframe of the farm implement employed for planting purposes. This is accomplished by powered means capable of remote control. (The folding is quite distinct from that heretofore effected by the employment of cables which in essence place the marker bar in a depending outrigger position where it projects a substantial distance from the end of the planter even in the folded condition.) The folding of this invention is effected by a special diversion arm in cooperation with an arrangement of elements which in combination not only permit the remote controlled elevation and folding operation but also facilitate or permit variations in the level of generally horizontal projection of the marking assembly in response to the level of the land traveled by the marker.

The new row marker is for a farm implement of the type having an elongated mainframe which is generally disposed transversely to the direction for its travel over a field in the farming operations or planting operations. The marker is characterized by having a horizontal base bar at the end of the elongated mainframe of the farm implement; and this horizontal base bar is placed in an orientation substantially parallel with the direction of travel for the mainframe over a field. A fixed vertical post is on the base bar at a location near one end thereof. To these elements a marker assembly is mounted in such a manner as to be swingable from a substantially horizontal orientation operative for marking into an upright overhead folded condition inoperative for marking.

The swingable marker assembly includes a main arm pivotally mounted to the base bar at the post location and extending substantially perpendicularly outward from the base bar. A marker bar is mounted at a location intermediate its ends as a pivotable member at the end of the main arm of the swingable marker assembly. A stub lever section of the marker bar extends on one side of its pivot mounting and a primary elongated section of the marker bar extends on the other. It is this marker bar on which the earth marking means is mounted.

A diversion arm extends in a plane or imaginary wall lying substantially transverse or perpendicular to the horizontal base bar and substantially parallel to the main arm. One end of the diversion arm is mounted for pivotal and longitudinally floating movement at a location proximate to the upper end of the post fixed to the base bar; and the other end of the diversion bar is pivotally mounted to the outer end of the stub lever section of the marker bar.

Powered means such as a hydraulic cylinder is provided for swinging the main arm of the swingable marker assembly about its pivot mounting to the base bar. The swinging action moves the main arm from a substantially horizontal projection into a substantially vertical or upright projection. The relationship between the pivot connections at each end of the diversion arm is effective to cause the marker bar to assume a perpendicular relationship to the main arm when the main arm projects substantially upright from its pivot mounting. The primary elongated section of the marker bar extends over the base bar and even over a portion of the mainframe of the farm implement when the main arm of the swingable assembly projects substantially upright from its pivot mounting. But the marker bar assumes a substantially horizontal relationship as an extension of the main arm of the swingable assembly when the main arm projects substantially horizontally from its pivot mounting.

Especially significant is the fact that the mounting for longitudinally floating movement of the diversion arm is such as to permit variations in the angle of horizontal projection of the main arm and the marker bar in response to the level of the land traveled by the marker bar. Thus the diversion arm is effective not only to place the marker bar in a perpendicular relationship to the main arm in the upright orientation of the swingable marker assembly, with the result that there is minimal height and outward projection of the entire assembly for turnaround operations at the end of a field, but also is effective to permit reliable row marking despite variations in the contour of a field as the marker assembly is extended for the purpose of effecting row marking.

Other benefits and advantages of the new row marker will become evident as the description proceeds.

BRIEF DESCRIPTION OF THE DRAWINGS

FIG. 1 is a schematic perspective view of a row marker of the invention (taken from the vantage point of standing in front of the path of travel for the marker), with the marker bar itself shown in a partially tilted condition or elevated condition so as to permit ready visualization of the several pivot connections;

FIG. 2 is a schematic perspective view, somewhat enlarged, and with parts broken away, of the base bar portion of FIG. 1 at which the mounting post is located and illustrates details of relationships at that portion;

FIG. 3 is a schematic view looking directly downward upon the row marker structure illustrated in FIG. 1;

FIG. 4 is a schematic plan view of the front or leading portion of a row marker as illustrated in FIG. 1, with the row marker of FIG. 4 in the extended substantially horizontal row marking condition;

FIG. 5 is a schematic plan view of the row marker of FIG. 1, shown in the upright folded condition inoperative for marking purposes and useful for the turnaround operation at the end of a field;

FIG. 6 is a fragmentary plan view of an adjustable assembly for a gauge wheel carried on the marker bar of the row marker, particularly viewing the same from a direction behind the direction of travel for the marker;

FIG. 7 is a fragmentary schematic cross-sectional view taken at line 6—6 of FIG. 6; and FIG. 8 is a fragmentary schematic plan view of a marking disk assembly carried on the marker bar of the apparatus.

DESCRIPTION OF THE PREFERRED EMBODIMENT

Referring to FIGS. 1 and 2 in particular, the row marker comprises certain basic foundation elements which may be characterized as a horizontal base bar 10 and a vertical post 15. The base bar 10 is for mounting at the end of an elongated mainframe of a farm implement or planter. It lies in an orientation which is substantially parallel with the direction of travel for the mainframe. The mounting of the base bar 10 is suitably accomplished by means of mounting bars 11 and 12 which extend between the base bar 10 and the end of an elongated mainframe. Frequently such end itself has a horizontal bar to which the mounting bars 11 and 12 extend and are clamped. Any suitable clamping means 13 and 14 may be employed to hold the base bar 10 in a horizontal orientation. An illustrative base bar may comprise an iron bar having measurements of about 5 cm. by 15 cm. in cross section and about 75 cm. in length (about 2 by 6 inches in cross section and about 30 inches in length). Suitably the base bar is a hollow bar, as illustrated. Its basic function is that of a foundation element. It may be otherwise united to the mainframe of a planter or even be a part of the mainframe.

Fixed to the base bar, as by welding, is a vertical post structure 15. This post structure 15 is near one end of the base bar. Preferably the post is formed of two flat pieces of iron such as plates 16 and 17. These flat pieces are welded to the base bar so as to have one side edge project outwardly from the side of the base bar away from the side adjacent the farm implement or planter. Further, the upper back or inner side edges of the plates 16 and 17 (that is the side edge of those plates facing toward the planter or farm implement) are preferably joined by a back plate 17-1; and this back plate 17-1 takes a bend to form an angled anchoring or brace leg 17-2 fixed to the inward or rear edge of the bar 10 as by welding.

Observe that the two plates 16 and 17 forming the post 15 carry slots 18 and 19 at their upper ends; and these two slots 18 and 19 are of generally horizontal orientation. Within the slots is a pin 20. The end of the pin projecting through slot 18 is provided with a suitable knob or bolt or nut member to maintain that end of the pin within the slot 18. The end of the pin projecting through the slot 19 is welded to a diversion arm 36. Thus the pin 20 slides in slots 18 and 19 in response to longitudinal movement of the diversion arm 36.

Another feature of the post 36 (see FIG. 2) is that of a bumper spring 21 mounted to project as a horizontal element from the back wall 17-1 and lie between the plates 16 and 17. The structure of this bumper spring arrangement suitably may consist of a bolt member extending through a hole in the back wall 17-1, with two coiled springs coaxially arranged on it, and a suitable washer or nut at the outward projection for maintaining the springs on the bolt or shaft. Importantly, the shaft on which the spring elements 21 are mounted is capable of sliding movement through its hole mounting to the back wall 17-1. In operations further to be described, a bumper member 22 on the main arm 23 is adapted to press against the bumper spring 21 as the swingable marker assembly is swung upwardly into what is called an upright folded condition. More will be said about that later in discussing elements at the portion 15-1 of the post below the base bar 10.

A main arm 23 is pivotally mounted as at pin 24 between the plates 16 and 17. At that portion the plates essentially form ear projections at the laterally outward side of the base bar 10. Thus the main arm 23 is in effect mounted to the base bar at the post location, and extends substantially perpendicularly outward from the base bar. A brace arm 25 (see FIG. 1) likewise is pivotally mounted to the base bar as at pin 26 which extends between ear members welded to the base bar 10. But the brace arm is preferably mounted to the base bar at a location spaced from the main arm; and this brace arm 25 extends outwardly from the base bar but angles toward (see FIG. 3) the main arm 23 and then angles in a parallel relationship along the terminal portion of the main arm 23. In effect, the brace arm 25 terminates at a location proximate to the end of the main arm 23. Observe also that a plate member 27, suitably characterized as a cover plate or stop, extends as a bar member or cover between the upper surfaces of the main arm 23 and brace arm 25. Cover 27 is welded to those arms at the location illustrated, which is near but spaced from a pin location 29 extending between the ends of the main arm 23 and brace arm 25.

A marker bar 28 is pivotally mounted at pin 29 between the outer ends of the main arm and brace arm. The pivot mounting 29 on the marker or tool bar is at a location on the marker bar intermediate its ends. Thus a stub lever section 30 of the marker bar 28 is movable in and out of a position between the short parallel terminal portions of main arm 23 and brace arm 25, with the stub lever section 30 of the marker arm 28 adapted to abut against the cover stop plate 27 when the marker bar 28 is in the maximumly extended position for row marking use.

Marker bar 28 preferably is one formed of telescoping sections so as to permit variation of its length at the primary elongated section 31; thus section 32 is but a telescopable section slidable into section 31 and appropriately fixed at any selected point as by any set screw or other equivalent means.

As illustrated, the marker bar suitably carries mounted on it a gauge wheel 33 which is adjustable in position not only lengthwise of the marker bar 28 but also in terms of its vertical or perpendicular relationship to the marker bar 28. Such a wheel 33, with its multiple adjustability, is desirable during row marking operations for the purpose of serving as a gauge or controller for the height of the marker bar as it traverses a field and thereby assisting in controlling the depth of row marking.

An outer marking disk 34, also highly adjustable as will be described, is mounted on the marker bar as an earth marking means. Also illustrated is an inner marking disk 35 mounted on the marking bar for earth marking.

The diversion arm 36 has previously been mentioned as an arm which at its inner end is welded or equivalently fixed to the end of the pin 20 extending through the slots 18 and 19 of the post 15. This diversion arm at its inner end pivot mounting 20 is to be noted as lying in an upward or vertically spaced relationship with respect to the pivot 24 of main arm 23. Still further, the inner pivot mounting 20 for the diversion arm successfully places the diversion arm in a plane or wall substantially parallel to the main arm 23 but not literally lying in the same imaginary vertical wall or plane through which the main arm 23 pivots. Recognize also that the pivot mounting 20 is a floating pivot mounting, that is a mounting slidable within slots 18 and 19. The other or outer end of the diversion arm 36 is pivotally mounted at a pin 37 extending between ear projections of the marker bar 28, and specifically at the outer end of the stub lever section 30 of the marker bar 28. To be emphasized is that the diversion arm 36 lies in a vertical plane or imaginary wall closely adjacent but parallel to the vertical plane in which the main arm 23 lies.

Further referring to FIGS. 1 and 2, there is preferably mounted a one-way hydraulic cylinder 38 (having appropriate remote controlled hydraulic lines feeding it) at a location such as to serve as powered means for elevating the main arm 23. Illustratively, one end of the hydraulic means 38 is mounted as at pin 39 extending between ears at the lower end 15-1 of the post; and the other end of the hydraulic means 38 is mounted at pin 40 extending between ears projecting downward on the lower side of the main arm 23. Both ends of mounting for the hydraulic means 38 are pivot mountings.

In operation, as the row marker is employed for earth marking, the main arm 23 extends horizontally outward from its pivot mounting 24 at the base bar, as also does the brace arm 25. In fact, the brace arm 25 pivots in unison with the main arm 23. The marker bar 28 extends outwardly as essentially a continuation of the main arm 23 during marking operations. This generally horizontal orientation of the main arm 23 and marker bar 28 for operative marking operations must allow some vertical movement of the entire assembly of the marker bar 28 and main arm 23. For example, the contour of land over which planting is accomplished can vary, a point to be especially recognized in light of the tendency towards larger and larger equipment in order to reduce man hours. As the contour of land varies, need arises for some variation of the level or angle of the generally horizontal orientation; and is made possible by the floating pivot 20 of diversion arm 36. The diversion arm 36 tends to move in its longitudinal direction as hard contour varies; and this movement shifts the location of pin 20 within the slots 18 and 19 at the upper end of the post 15. Thus the slots 18 and 19 are of appropriate length to permit variation of the angle of horizontal orientation for the main arm 23 and marker bar 28 as encountered in actual planting operations.

But when the planting equipment reaches the end of a field, the operator simply swings the marker assembly uprightly by remote control of the hydraulic lines feeding the hydraulic means 38. As the main arm 23 is elevated by the powered means 38, the initial happenings are that pin 20 is slid by diversion arm 36 toward the back side or inner end (nearest the planting equipment) of the slots 18 and 19. Recognize that cover plate 27 limits upward movement of the stub lever portion 30 of the marker bar. Thus, further elevation of the main arm 23 effectively causes the diversion arm 36 to pivot the marker bar 28 at its pivot mounting 29, with the pivot movement always depressing the stub lever 30 and elevating the elongated portion 31. The assembly starts to assume the relative orientation between elements as illustrated in FIG. 1. Then still further elevational movement of the main arm 23, as effected by the powered means 38, effectively causes the marker bar 28 to assume a more or less perpendicular relationship to the main arm and brace arm 25; and this relationship is illustrated in FIG. 5. The result is that the powered means 38 simultaneously effectively folds the marker bar 28 as it elevates the main arm 23 and brace arm 25 into a more or less vertical or upright relationship as illustrated in FIG. 5. In effect the marker bar 28 is placed at an overhead orientation more or less above the end of the planting equipment. That equipment is schematically illustrated in FIG. 5 as consisting of the elongated planter mainframe 41, a seed box 42, and a wheel 43. The importance of this folded upright relationship inoperative for marking cannot be overemphasized. It effectively substantially removes the swingable row marker assembly from its projection as an outward assembly at the end of the planting equipment. Only a slight outward projection remains; and even this outward projection can be minimized by forming the foundation elements for the row marker as an integral part of the end of the elongated mainframe of the planting equipment. Still further, upward projection is minimized; and ends of fields bordered by trees and the like can be approached with very close tolerance during the turnaround operation.

There is yet another feature of the preferred row marker of the invention. It has previously been mentioned that the hydraulic means 38 is preferably a one-way acting hydraulic cylinder, used solely for the lifting action or elevating action just aforedescribed. With particular reference to FIG. 2, it should be noted that at the upper extremity of the lifting action effected by the powered means 38, a bumper plate 22 on the main arm 23 is pressed against the bumper spring assembly 21 and effectively presses the spring arrangement 21 against the back plate 17-1 or mounting for the spring assembly 21. The action compresses the spring 21; and the hydraulic means 38 is maintained under pressure to force the main arm 23 as far into an upright condition as is permitted within the confines of the limitation imposed by the particular relationship between the pivot mountings. Thus, as the turnaround operation is accomplished, the spring 21 is maintained under compression. It has stored-up energy; but on release of the hydraulic powered means 38, the spring exhibits a recoil action employing that stored-up energy to push the main arm 23 outwardly away from the post 15. Thus, after the turnaround operation is completed and the pressure exerted by the hydraulic powered means 38 is released, there is a simultaneous release of the compressive pressures building in the spring assembly 21. The result is that the main arm 23 is pushed away from the post member 15 in a swinging action toward a downward direction, which in turn causes the diversion arm 36 to unfold the swingable marker assembly as it falls downwardly toward the horizontal. The marker assembly moves back through the relative position illustrated in FIG. 1 and finally the position illustrated in Figures 3 and 4, where it is in a condition for row marking. All of this is accomplished with simplicity and speed and by remote control so as to minimize delay at turnaround operations and save on man hours of planting, while at the same time effectively permitting planting much closer than heretofore realizable at the ends of fields.

Referring now particularly to FIGS. 6 and 7, a suitable assembly for the wheel 33 on the marker 28 may comprise a post or shaft 44 on which an axis for the wheel is mounted, and a bracket 45 embracing both the marker bar 28 and the vertical shaft 44 for the wheel. Both the wheel shaft 44 and the marker bar 28 are slidable through the bracket 45. A single set screw or bolt 46 in the bracket 45 may be employed to tighten and fix the position of the wheel shaft 44 as well as the marker bar 28 in a desired relative relationship.

Earth marking disks as illustrated at 34 in FIG. 8 may be carried on the marker bar 28 by any suitable mounting. Preferably, the mounting is highly adjustable as illustrated in FIG. 8, with an angle bracket 47 rotatable through 360° about its bolt mounting 47-1 on the marker bar 28. The angle bracket 47 at its other or lower plate member merges into a shaft 48 preferably of cylindrical nature. To the shaft 48 is mounted a split sleeve or generally U-shaped member having cylindrical inner surfaces and tightenable by means of a bolt 50 so as to fix it in any desired 360° relationship about the shaft 48. An ear 51 depending from the assembly 49 may be employed as the fixed mounting point for a disk 34.

It should be recognized that different operators have different preferences as to whether the dirt or earth should be thrown inwardly or outwardly by a marking disk. Some prefer outward throwing and have found that tractors equipped with annularly ridged steerable wheels can effectively be employed to accomplish more or less automatic steering when the ridge is placed in the groove formed by a disk marker. At the least, this aids in accomplishing appropriate steering so as to minimize any overplanting of a portion of a field as well as any underplanting or missing of any portion of a field.

Thus has been described a new and improved row marker, one capable of almost extraordinary extension at the lateral end of a farm implement and yet capable of being elevated into an upright overhead folded condition with minimum outward and upright projection at the end of the farm implement during times when the implement or planter is to be turned around. Importantly, despite the normal limitations ordinarily associated with folding, the new marker of this invention is capable of following the contour of soil or earth during effective marking operations without loss of the capability for being swung into an overhead folded upright condition.

It should be mentioned that the brace arm 25 may in fact be more closely integrated into the main arm 23 than that illustrated as preferred. Also, contoured bracing elements may extend between the brace arm 25 and the main arm 23 so long as interference with the operation of the diversion arm 36 is avoided.

Still further, the invention may be embodied in many other specific forms without departing from the spirit or essential characteristics of the preferred embodiment. The present embodiment is therefore to be considered in all respects as illustrative and not restrictive, the scope of the invention being indicated by the appended claims rather than by the foregoing description; and all changes which come within the meaning and range of equivalency of the claims as construed for validity are therefore intended to be embraced thereby.

That which is claimed is:

1. A row marker for a farm implement of the type having an elongated mainframe which is generally disposed transversely to the direction for its travel over a field in farming operations, comprising a horizontal base bar at the end of the elongated mainframe and having an orientation substantially parallel with the direction of travel for the mainframe, a vertical post fixed on the base bar at a location near one end thereof, a marker assembly swingable from a substantially horizontal orientation operative for marking into an upright overhead folded condition inoperative for marking, said marker assembly comprising, a main arm pivotally mounted to the base bar at the post location and extending substantially perpendicularly outward from the base bar, a marker bar carrying earth marking means mounted at a location intermediate its ends as a pivotable member at the end of said main arm, with a stub lever section of the marker bar extending on one side of the pivot mounting thereof and a primary elongated section of the marker bar extending on the other, and a diversion arm extending substantially transversely to the horizontal base bar and having one end thereof mounted for pivotal and longitudinally floating movement at a location proximate to the upper end of said post and the other end thereof pivotally mounted to the outer end of the stub lever section of the marker bar, a brace arm having one end pivotally mounted to the base bar at a spaced location from the pivotal mounting of the main arm and connected at its other end to said marker arm for bracing the pivot mounting for the marker arm, said brace arm extending at an angle with respect to said main arm, and powered means for swinging said main arm upwardly about its pivot mounting to the base bar from a substantially horizontal projection from the base bar into a substantially upright projection from the base bar, the relationship between the pivot connections at each end of the diversion arm being alone effective to cause the marker bar to assume a substantially perpendicular relationship to the main arm when the main arm projects substantially upright from its pivot mounting, and to assume a substantially aligned relationship to the main arm when the main arm projects generally horizontally from its pivot mounting, said mounting for longitudinally floating movement of said diversion arm being such as to permit variations in the angle of horizontal projection of the main arm and marker bar in response to the level of the land over which the marker bar travels.

2. The row marker of claim 1 additionally comprising spring means compressed by the main arm at the upward extremity of its movement, said spring means being effective to push the main arm toward a downward pivot on release of the powered means.

3. The row marker of claim 1 additionally comprising a gauge wheel and adjustable means for mounting the gauge wheel on the marker bar.

4. The row marker of claim 1 wherein the mounting for longitudinally floating movement of the diversion arm comprises a pin and slot assembly.

5. The row marker of claim 1 additionally comprising a stop member against which the stub end of the marker bar abuts to limit the pivot movement of the stub lever section of the marker bar when the marker assembly is in horizontal orientation.

6. A row marker for a farm implement of the type having an elongated mainframe which is generally disposed tranversely to the direction for its travel over a field in farming operations, comprising a horizontal base bar at the end of the elongated mainframe and having an orientation substantially parallel with the direction of travel for the mainframe, a vertical post fixed on the base bar at a location near one end thereof, a main arm pivotally mounted to the base bar at the post location and extending substantially perpendicularly outward from the base bar, a brace arm pivotally mounted to the base bar at a location spaced from the main arm and extending angularly outwardly from the base bar and terminating at a location proximate to the end of the main arm a marker bar pivotally mounted between the outer ends of the main arm and brace arm, the pivot mounting of the marker bar being at a location on the marker bar intermediate its ends, with a stub lever section of the marker bar extending on one side of the pivot mounting thereof and a primary elongated section of the marker bar extending on the other, said marker bar having mounted thereon an earth marking means, a diversion arm between said main arm and brace arm and having one end mounted for pivotal and longitudinally floating movement at a location proximate to the upper end of said post and the other end pivotally mounted to the outer end of the stub lever section of the marker bar, and a hydraulic powered means actuatable into extension for swinging the main arm from a substantially horizontal projection from its pivot mounting to the base bar into a substantially upright projection from its pivot mounting to the base bar, the relationship between the main arm and brace arm being such as to cause the main arm and brace arm to swing in unison, the pivot connections at each end of the diversion arm being alone effective to cause the marker bar to assume a perpendicular relationship to the main arm when the main arm projects substantially upright from its pivot mounting and a substantially aligned relationship to the main arm when the main arm projects substantially horizontally from its pivot mounting, said mounting for longitudinally floating movement of said diversion arm being such as to permit variations in the angle of horizontal projection of the main arm and marker bar in response to the level of the land traveled by the marker bar.

7. The row marker of claim 6 additionally comprising spring means compressed by the main arm at the upward extremity of its movement, said spring means being effective to push the main arm toward a downward pivot on release of the powered means.

8. The row marker of claim 6 additionally comprising a gauge wheel and adjustable means for mounting the gauge wheel on the marker bar.

9. The row marker of claim 6 wherein the mounting for longitudinally floating movement of the diversion arm comprises a pin and slot assembly.

10. The row marker of claim 6 additionally comprising a stop member against which the stub end of the marker bar abuts to limit the pivot movement of the stub lever section of the marker bar when the marker assembly is in horizontal orientation.

* * * * *